United States Patent [19]

Matake

[11] Patent Number: 4,886,378
[45] Date of Patent: Dec. 12, 1989

[54] THRUST BEARING DEVICE

[75] Inventor: Kozo Matake, Kanagawa, Japan

[73] Assignee: Ebara Corporation, Tokyo, Japan

[21] Appl. No.: 292,011

[22] Filed: Dec. 30, 1988

[30] Foreign Application Priority Data

Jan. 14, 1988 [JP] Japan .................................. 63-3172

[51] Int. Cl.⁴ ............................................ F16C 17/06
[52] U.S. Cl. .................................... 384/308; 384/124
[58] Field of Search ............... 384/308, 122, 124, 306, 384/307, 312, 309

[56] References Cited

U.S. PATENT DOCUMENTS

| 4,496,251 | 1/1985 | Ide | 384/124 |
| 4,515,486 | 5/1985 | Ide | 384/122 |
| 4,676,668 | 6/1987 | Ide | 384/308 |

FOREIGN PATENT DOCUMENTS 53-56448  5/1978  Japan .
1392245  4/1975  United Kingdom .

Primary Examiner—Lenard A. Footland
Attorney, Agent, or Firm—Wenderoth, Lind & Ponack

[57] ABSTRACT

A thrust bearing device is constructed to comprise a sliding disk; and
  a sliding shoe member;
    both having a sliding surface respectively adapted to slidably contact with each other and one of which is arranged to be the rotary side of the bearing device and the other arranged to be the stationary side, the sliding shoe member being a unitary member formed in a special configuration in that it is provided with plural sliding shoes supported on a common base through ribs, each shoe having a flat surface coplanar with the flat surfaces of the other shoes to constitute a common sliding surface of the shoe member. The stationary side of the device is fixed on a motor bracket with an elastic sheet interposed therebetween.

3 Claims, 4 Drawing Sheets

THRUST BEARING DEVICE

FIELD OF THE INVENTION

The present invention relates to a thrust bearing device and more particularly to such a device that is used in an electric motor wherein liquid is contained within the casing thereof and the liquid serves to lubricate the thrust bearing device.

BACKGROUND OF THE INVENTION

Heretofore, a thrust bearing device of the type referred to above has involved the use of plural tilting pads, each pad being designed to have a particular configuration such as projecting or inflating in the central region thereof. These pads serve to constitute one of the opposing sliding surfaces. Use of these pads has in turn involved the employment of several related means and many parts which demand additional expense for the installation and maintenance thereof, maintenance being difficult. There has accordingly been a demand for a thrust bearing device of the above type which requires fewer parts and is not expensive to manufacture, install or maintain.

SUMMARY OF THE INVENTION

It is an object of the present invention to provide a thrust bearing device for an electric motor filled with liquid which serves to lubricate the bearing device, the bearing device comprising relatively few components which facilitates installation and maintenance thereof.

The above object is accomplished by a thrust bearing device according to the present invention. The thrust bearing device of the present invention is constituted to comprise a sliding disk and a sliding shoe member each having a sliding surface adapted to slidably contact each other. Either one of these two components is arranged to be a rotary member fixed to a motor shaft and the other is arranged to be a stationary member disposed on a motor bracket with an elastic sheet interposed therebetween.

The sliding shoe member is made of metal in a special configuration, being provided with plural shoes each having a flat surface and unitarily supported on a common base through a rib, and each of the flat surfaces of these shoes forms a segment of a common plane so that it constitutes a sliding surface of the shoe member with the flat surfaces of the other shoes.

The sliding disk is made of carbon impregnated with plastics or Babbitt metal. Further, details of the device will be explained following the brief description of the drawings noted below.

BRIEF DESCRIPTION OF THE DRAWINGS

FIGS. 2A, 2B and 2C illustrate the construction of a thrust bearing device according to the present invention in which FIG. 2A shows a cross-section of the device wherein a sliding shoe member is arranged to be stationary;

FIG. 2B is a plan view of the sliding shoe member as viewed from the top; and

FIG. 2C shows a side view of the sliding shoe member;

FIG. 4A is a cross section of the device, FIG. 4B a plan view of the sliding shoe member as viewed from the bottom and FIG. 4C a side view of the shoe member.

DESCRIPTION OF THE PRFERRED EMBODIMENTS

Figure 1:
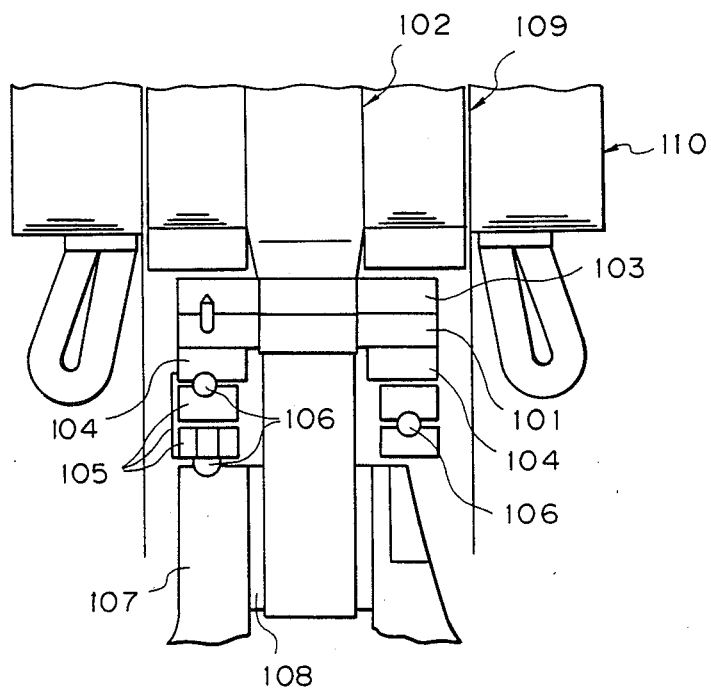
FIG. 1 illustrates a conventional thrust bearing device employing a tilting pad system.

Before explaining the present invention, an example of prior art is explained by referring to FIG. 1. As shown in FIG. 1, the rotary side of the bearing device comprises a rotary disk 101; and a thrust disk 103 adapted to hold in place the disk 101 and attached to a main shaft 102; and the stationary side of the device comprises plural tilting pads 104 adapted to slidably contact the sliding surface of the rotary disk 101; retaining means 105 for retaining the tilting pads 104; and a complicated alignment mechanism constituted by several components 106 adapted to keep the respective sliding surfaces of the tilting pads 105 coplanar and this stationary side of the bearing device is simply placed on a bracket 107 of the motor.

Each of the sliding surfaces of tilting pads 104 is given a particular shape which is configured in a so-called centrally projected or inflated shape, the center portion being higher than the opposite ends, so that a wedge shaped lubricating film is properly formed between the centrally projected surfaces of the tilting pads and the surface of the rotary disk 101 during the relative rotation therebetween. In this drawing, 108 is a radial bearing, 109 a rotor and 110 a stator.

In the conventional thrust bearing device explained above, the following drawbacks may be observed.

(1) It is expensive to manufacture since the alignment mechanism constituted by the many components 106 is complicated;

(2) a retaining means constituted by components 105 is required in order to allow excessive freedom for tilting pads 104;

(3) fabrication and maintenance is not easy because of the special configuration given to the sliding surface of the tilting pads 104;

(4) installation of the thrust bearing device is limited to a particular procedure since the alignment mechanism constituted by components 106 is not fixed to the motor bracket 107;

(5) there is difficulty involved in using common components on the rotary and stationary sides; and (6) maintenance is not easy because of the high precision required of the components 106 constituting the alignment mechanism.

In view of the foregoing, the present invention has been conceived by unifying several components on the side, i.e., either the stationary or rotary side, of the thrust bearing device so as to overcome the drawbacks noted above without adversely affecting the performance heretofore achieved in prior art.

Now the present invention will be explained hereunder.

Figure 2A:
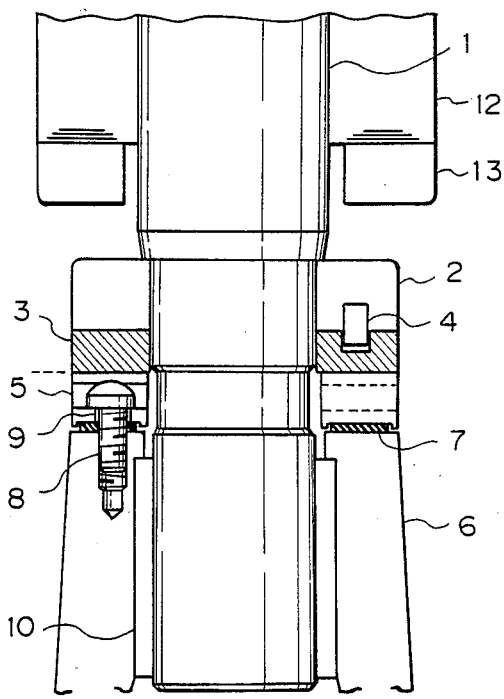

In FIG. 2, an embodiment of a thrust bearing device according to the present invention is illustrated in which a motor casing is filled with liquid which serves to lubricate the thrust bearing device. A metallic thrust disk 2 is mounted at the lower portion of a primary shaft 1 of a motor by adapting a shrinkage fitting. On the lower surface of the thrust disk 2 is disposed a sliding disk 3 which is arrested with the disk 2 by a pin 4, the disk 3 being made of a material primarily comprising carbon impregnated with plastics or Babbitt metal.

The disk 3 has a sliding surface on the lowest side and constitutes the rotary side of the thrust bearing device.

Figure 2B:
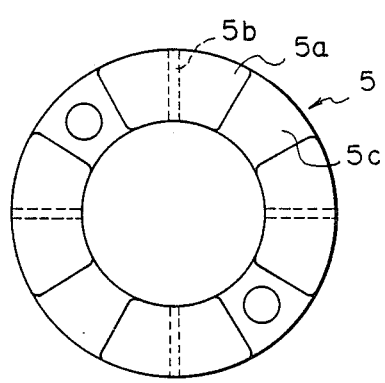
Figure 2C:
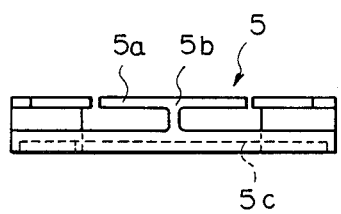

Below the disk 3, a sliding shoe member 5 is disposed and constitutes the stationary side of the thrust bearing device. The member 5 is of metal and is provided with plural sliding shoes 5a as shown in FIGS. 2B and 2C. Each shoe 5a has a flat sliding surface that forms a segment of a common co-planar surface and is supported on a common base 5c through a rib 5b. In other words, the shoe member 5 is made in one piece and the sliding surfaces of the shoes 5a are disposed in a common flat plane constituting a sliding surface of the shoe member 5 opposing and slidably contacting the lower surface of the disk 3. The shoe member 5 is fixed on a motor bracket 6 by means of a screw 8 with an elastic bearing sheet 7 made of rubber or the like interposed between the bracket 6 and the shoe member 5.

The lower end of the shaft 1 is rotatably supported by a radial bearing 10. A collar 9 is placed around the sclew 8. In the drawing, 12 is a rotor, and 13 denotes a secondary conductor.

The thrust bearing device illustrated in FIG. 2 functions as shown in FIG. 3 which will be explained below.

Figure 3A:
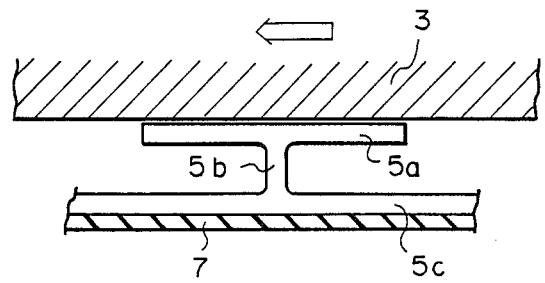
FIGS. 3A and 3B schematically illustrate the function of the device.
Figure 3B:
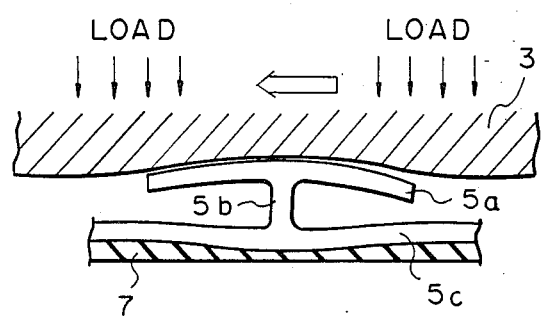

FIG. 3A schematically shows a condition wherein no load is applied on the thrust bearing device. Since no load is applied in the axial direction on the shoe member 5, the shoe 5a is not deformed. However, when load is applied in the axial direction as shown in FIG. 3B, the shoe 5a is deformed downwardly in proportion to the applied load assuming its rib 5b to be the center of deformation and a liquid film in a wedge shape is formed between the rotary disk 3 and the shoes 5a. Also, the portion of the base 5C below the rib 5b is deformed with the deformation of elastic sheet 7. Hence a high loading capacity can be expected of this device as in the case of a conventional thrust bearing device employing a tilting pad system.

Also, due to the presence of the elastic bearing sheet 7, the inevitable manufacturing tolerances created between the sliding surface of the disk 3 and the top surface of the bracket 6 are absorbed or compensated for by the deformation of the sheet 7. This prevents local contact of the sliding surfaces of the shoes 5a and the sliding mode of the respective shoes is kept uniform.

Figure 4A:
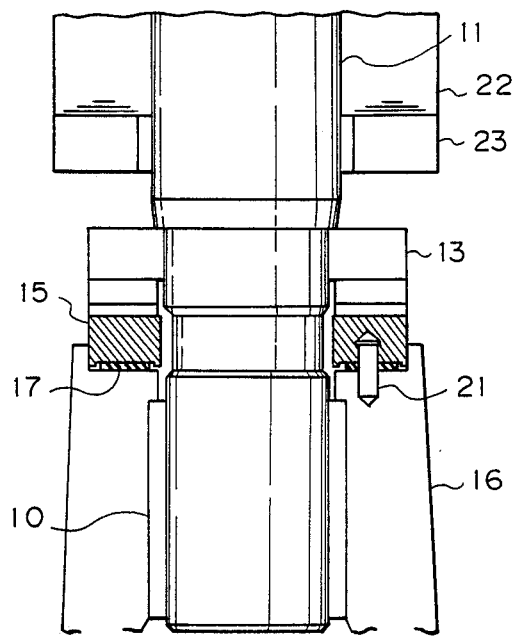
FIGS. 4A 4B and 4C show another embodiment of the invention wherein the sliding shoe member is employed as a rotary member.
Figure 4B:
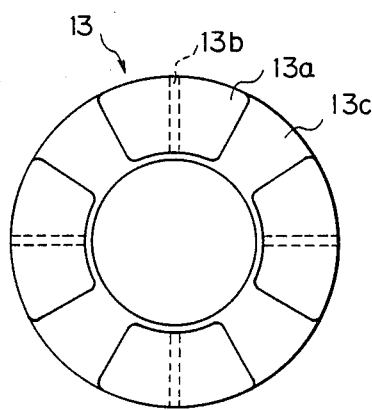
Figure 4C:
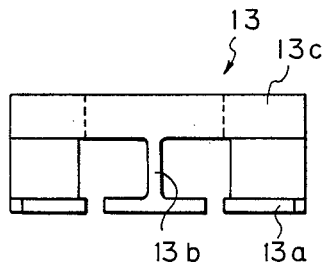

In FIG. 4, another embodiment of the present invention is illustrated in which the stationary side and the rotary side of the thrust bearing device shown in FIG. 2 are interchanged with each other.

In this case, a sliding shoe member 13 made of metal is arranged to be a rotary side member. The shoe member 13 is configured in a similar manner to the shoe member 5 shown in FIG. 2 and is provided with plural sliding shoes 13a each having a flat sliding surface arranged with the other shoe surfaces in a common plane and supported on a common base 13C by a rib 13b, respectively. The shoe member 13 is fixed to a primary shaft 11 of a motor by means of a shrinkage fitting or the like. A disk 15 constitutes a stationary side member having a sliding surface and is placed on a motor bracket 16 with an elastic bearing sheet 17 made of rubber or the like interposed therebetween.

The disk 15 is primarily made of carbon impregnated with plastics or Babbitt Metal and is arrested on the bracket 6 by means of a pin 21. Reference number 22 is a rotor and 23 denotes a secondary conductor. In this embodiment, a rotary disk similar to the disk 2 shown in FIG. 2 may be omitted so that the construction of the rotary side can be further simplified. The function of the shoe member 13 is almost the same as that of the shoe member 5 of FIG. 1.

It is apparent that the configuration of the sliding shoe member 5 or 13 may be complex; however, it can be easily manufactured by casting using a lost-wax process or the like. Further the sliding surfaces of plural shoes can be machined at one time in a common plane (lapping finish). With the construction of the thrust bearing device according to the present invention, the following advantages may be observed and/or expected.

(a) A high thrust loading capacity can be expected similar to that of a device employing a so-called tilting pad system;

(b) The manufacturing tolerances of the related parts can be absorbed by an elastic bearing sheet;

(c) An alignment mechanism is not required;

(d) Cost saving can be expected by as much as ⅓-1/5 of the cost of the stationary side of a conventional device;

(e) manufacturing is easy since fabrication of complex surfaces such as the centrally projected or inflated configuration required in the tilting pad system is not necessary;

(f) Provision of excessive freedom of the bearing components such as the tilting pads is unnecessary which facilitates assembly and installation of the thrust bearing device as a whole; and (g) components on the rotary side and the stationary side may be interchanged since the shoe member is a unitary member.

What is claimed is:

1. A thrust bearing device for an electric motor lubricated by liquid within a motor casing comprising;

a sliding disk having a sliding surface; and a sliding shoe member provided with plural sliding shoes unitarily supported on a common base through respective ribs, each shoe having a flat sliding surface coplanar with the surfaces of the other shoes and adapted to slidably contact said sliding surface of said sliding disk, either one of said sliding disk or said sliding shoe member being arranged to be the stationary side of the thrust bearing device and disposed on a motor bracket with an elastic sheet interposed therebetween and the other being arranged to be the rotary side of the thrust bearing device and fixed to a motor shaft.

2. A thrust bearing device as claimed in claim 1 wherein said disk is the rotary side of the thrust bearing device and is made of carbon impregnated with plastics or Babbitt Metal and said shoe member is the stationary side and made of metal.

3. A thrust bearing device as claimed in claim 1 wherein said disk is the stationary side of the thrust bearing device and is made of carbon impregnated with plastics or Babbitt Metal and said shoe member is the rotary side and made of metal.

* * * * *